United States Patent
Rhyne et al.

(10) Patent No.: US 10,889,031 B2
(45) Date of Patent: Jan. 12, 2021

(54) METHOD OF CURING A POLYMERIC FORM AND CURING DEVICE FOR POLYMERIC MATERIALS USING THERMAL EXPANSION

(71) Applicants: Timothy Brett Rhyne, Greenville, SC (US); Brian D. Wilson, Greenville, SC (US); Adib Tony Chebli, Greenville, SC (US); Steven M. Cron, Greenville, SC (US)

(72) Inventors: Timothy Brett Rhyne, Greenville, SC (US); Brian D. Wilson, Greenville, SC (US); Adib Tony Chebli, Greenville, SC (US); Steven M. Cron, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 352 days.

(21) Appl. No.: 15/570,800

(22) PCT Filed: Apr. 29, 2016

(86) PCT No.: PCT/US2016/030019
§ 371 (c)(1),
(2) Date: Oct. 31, 2017

(87) PCT Pub. No.: WO2016/178970
PCT Pub. Date: Nov. 10, 2016

(65) Prior Publication Data
US 2018/0117801 A1  May 3, 2018

Related U.S. Application Data

(60) Provisional application No. 62/155,938, filed on May 1, 2015.

(30) Foreign Application Priority Data

May 29, 2015 (WO) ................ PCT/US2015/033256

(51) Int. Cl.
*B29C 43/10* (2006.01)
*B29C 33/38* (2006.01)
(Continued)

(52) U.S. Cl.
CPC .............. *B29C 43/10* (2013.01); *B29C 33/38* (2013.01); *B29C 43/32* (2013.01); *B29C 43/36* (2013.01);
(Continued)

(58) Field of Classification Search
CPC . B29C 43/10; B29C 43/32; B29C 2043/3261; B29D 30/02
See application file for complete search history.

(56) References Cited

U.S. PATENT DOCUMENTS

| | | |
|---|---|---|
| 3,316,337 A | 4/1967 | North |
| 4,095,480 A | 6/1978 | Schwagauer |

(Continued)

FOREIGN PATENT DOCUMENTS

| | | |
|---|---|---|
| EP | 893237 A2 | 1/1999 |
| EP | 1000725 A1 | 5/2000 |

(Continued)

OTHER PUBLICATIONS

International Search Report with Written Opinion for application PCT/US2016/030019 dated Jul. 18, 2016.
(Continued)

*Primary Examiner* — Jacob T Minskey
*Assistant Examiner* — Virak Nguon
(74) *Attorney, Agent, or Firm* — Hahn Loeser & Parks LLP; Bret A. Hrivnak (57) ABSTRACT

The present invention is related to a method and an apparatus for curing a polymeric form. The method includes
(Continued)

arranging an uncured polymeric form within a curing chamber (60) formed by a base member (20) and a constraining member (40). A thermal expansion member (30) is additionally positioned within the curing chamber (60) with the uncured polymeric form (70) such that the thermal expansion member and the uncured polymeric form are positioned between the base member (20) and the constraining member (40). The thermal expansion member (30) is heated to expand in size into an expanded state. In the expanded state the thermal expansion member (30) applies pressure to the uncured polymeric form (70) within the curing chamber. The expansion of the thermal expansion member (30) is maintained to maintain the application of pressure to the uncured polymeric form while the uncured polymeric form is being cured to form a cured polymeric form.

19 Claims, 3 Drawing Sheets

(51) Int. Cl.
*B29C 43/32* (2006.01)
*B29D 30/02* (2006.01)
*B29C 43/36* (2006.01)
*B29C 43/52* (2006.01)

(52) U.S. Cl.
CPC .............. *B29D 30/02* (2013.01); *B29C 43/52* (2013.01); *B29C 2043/3261* (2013.01)

(56) References Cited

U.S. PATENT DOCUMENTS

| | | | | |
|---|---|---|---|---|
| 4,889,668 | A * | 12/1989 | Kemp | B29C 33/04 264/40.5 |
| 5,084,219 | A * | 1/1992 | Sigur | B29C 33/38 156/173 |
| 5,204,042 | A * | 4/1993 | James | B29C 70/443 264/257 |
| 6,113,833 | A * | 9/2000 | Ogawa | B29D 30/12 156/110.1 |
| 6,174,484 | B1 * | 1/2001 | Thompson | B29C 33/3828 249/142 |
| 2012/0119060 | A1 * | 5/2012 | Kuntz | B29C 33/3842 249/80 |
| 2013/0287882 | A1 * | 10/2013 | Wilson | B29D 30/02 425/425 |
| 2015/0352755 | A1 * | 12/2015 | Kagota | B29C 43/027 425/28.1 |
| 2017/0361554 | A1 * | 12/2017 | Seroka | B29D 30/0662 |

FOREIGN PATENT DOCUMENTS

| | | |
|---|---|---|
| EP | 2818291 A1 | 12/2014 |
| GB | 241176 A | 4/1926 |

OTHER PUBLICATIONS

International Search Report with Written Opinion for application PCT/US2015/033256 dated Feb. 1, 2016.
New Generation Lithium Secondary Battery Technology, Kai Xie, pp. 263-264, National Defense Industry Press, Aug. 2013.

* cited by examiner

METHOD OF CURING A POLYMERIC FORM AND CURING DEVICE FOR POLYMERIC MATERIALS USING THERMAL EXPANSION

CROSS-REFERENCE TO RELATED APPLICATIONS

This application claims priority to, and the benefit of, International patent application no. PCT/US2015/033256, filed May 29, 2015 with the US Patent Office (as the US Receiving Office), and U.S. provisional patent application No. 62/155,938, filed May 1, 2015 with the US Patent Office, each of which are hereby incorporated by reference.

BACKGROUND OF THE INVENTION

Field of the Invention

This invention relates generally to curing devices for curing polymeric forms, and more specifically, curing devices for curing annular polymeric forms.

Description of the Related Art

Conventional methods for curing uncured polymeric forms include a mechanical curing press. In accordance with these conventional methods, an uncured polymeric form is placed within the mechanical curing press, where the press applies pressure to the uncured polymeric material by virtue of positional movement (i.e., translation) of one or more press components. When the polymeric material is used to form a tire tread in combination with a shear layer (also referred to as a shear band) for use in manufacturing non-pneumatic tires, such as those described in U.S. Patent Application Publication No. US 2004/0159385 and U.S. Patent Application Publication No. US 2007/0267116, the press includes intricate mold components for forming various void features resulting in a tread pattern along the outer, ground-engaging side of the tread, which adds complexity and cost to the process. To increase the rate of production by reducing the time required to cure a polymeric product, incremental reductions in time require a significant increase heat. To achieve these significant increases, significant costs are incurred. Such costs not only include financial costs, but also a reduction in properties for the cured polymeric material, which ultimately sacrifice product performance. For example, with regard to the tire tread product coupled with a shear band, as discussed above, applying elevated temperatures can increase rolling resistance, reduce tire durability, and/or induce higher wear rates, for example. Therefore, the mechanical curing press is an impediment to achieving increased rates of production/reduced production time. Accordingly, there is a need to provide a method and apparatus for curing polymeric material at lower financial costs and using curing parameters (temperatures) that do not reduce product performance or properties.

SUMMARY OF THE INVENTION

Particular embodiments of the invention include a method of curing a polymeric form. The method for curing a polymeric form includes the step of arranging an uncured polymeric form along a base member, the base member being at least semi-rigid at least when in a curing configuration. A thermal expansion member is arranged in close relation to the uncured polymeric form and either on a side of the uncured polymeric form opposite the base member or between the uncured polymeric form and the base member. A constraining member is arranged opposite the base member wherein the thermal expansion member and the polymeric form are both positioned between the constraining member and the base member. The constraining member maintains a constant position in relation to the base member.

The method for curing a polymeric form further includes the step of heating the thermal expansion member to expand the thermal expansion member in size and into an expanded state. In the expanded state the thermal expansion member applies pressure to the uncured polymeric form with the base member being in an at least semi-rigid curing configuration. The expansion of the thermal expansion member is maintained in the expanded state to maintain the application of pressure to the uncured polymeric form while the uncured polymeric form is being cured for form a cured polymeric form. A step of curing the uncured polymeric form is performed to cure the polymeric form.

The method for curing a polymeric form additionally includes separating the cured polymeric form and the thermal expansion member. This step may further include cooling the thermal expansion member or the cured polymeric form from the expanded state to reduce the size of the thermal expansion member and/or the cured polymeric form.

The foregoing and other objects, features, and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

Embodiments of the invention comprise methods and apparatus for curing an uncured polymeric form using a thermal expansion member, whereby expansion of the thermal expansion member applies curing pressures to the uncured polymeric form. Accordingly, by using the apparatus and methods discussed herein, in particular embodiments, the use of a conventional mechanical curing press may be eliminated when curing polymeric forms. In other embodiments, a mechanical press may be used in conjunction with the methods and apparatus described herein to further optimize the curing time.

Because the curing device relies on a thermal expansion member to apply pressure to the polymeric form by virtue of thermal expansion to cure the polymeric form, at least a portion of the curing chamber is defined by a semi-rigid or rigid structure to at least partially resist the pressure generated by the thermal expansion member and ensure that the polymeric form is under pressure (compressed) during curing operations. To achieve this, as noted previously, the polymeric form is arranged between a thermal expansion member and a pressure-resisting structure, which may be a rigid or semi-rigid structure.

Particular embodiments of such methods for curing a polymeric form include arranging an uncured polymeric form along a base member, and arranging a thermal expansion member in close relation to (operable communication with) the uncured polymeric form and on a side of the uncured polymeric form opposite the base member. In arranging the thermal expansion member in close relation to the uncured polymeric form, the thermal expansion member is able to communicate pressure (that is, compressive forces) to the polymeric form for the purpose of placing the polymeric form under compression to facilitate curing of the polymeric form. It is appreciated that the application of pressure by the thermal expansion member may occur directly (that is, by direct contact or engagement) or indirectly through one or more intermediates arranged between the uncured polymeric form and the thermal expansion member.

The base member is at least semi-rigid when in a curing configuration. This means that the base member may be either semi-rigid or substantially rigid during curing conditions, that is, when exposed to curing temperatures and pressures when the thermal expansion member is in an expanded state during curing, since the base member is configured to at least partially resist forces generated by expansion of the thermal expansion member to maintain the uncured polymeric form in a position that permits such forces to place the uncured polymeric form under compression. In being semi-rigid or substantially rigid, the base member is not elastic or otherwise sufficiently deformable or flexible during curing conditions. Instead, the base member remains semi-rigid or substantially rigid. A rigid structure is a structure that does not substantially deform while exposed to the pressures generated by the thermal expansion member and other conditions, such as elevated temperatures, arising during particular curing operations. It is appreciated that a semi-rigid structure may deform within an acceptable range sufficient to at least partially resist the pressure being generated by the thermal expansion member and to maintain the polymeric form in a compressed state during curing operations, and while exposed to particular conditions arising during the curing operations. Semi-rigid or rigid materials include metals and metal alloys, certain plastics, stone, and even certain thermally-expandable materials. Therefore, in certain embodiments, the base member is a second thermal expansion member. By example, steel or aluminum could be used thereby providing good heat transfer and a sufficient modulus of elasticity. In the instance of using aluminum, aluminum expands more than steel aluminum and, by comparison, would assist in generating a greater curing pressure.

By being at least semi-rigid during curing, it is appreciated that the base member may be less than semi-rigid before curing. For example, while the base member is unitary or monolithic in certain embodiments, in other embodiments at least portions of the thermal expansion member may be expandable, flexible, or movable prior to or until reaching a semi-rigid or substantially rigid configuration when the thermal expansion member expands during curing.

It is appreciated that the base member may form a portion of the curing device or may be inserted into the curing device with the polymeric form. That being said, it is appreciated that the uncured polymeric form may be formed, assembled, or otherwise arranged along the base member before arrangement within the curing device. For example, in particular embodiments, the base member forms an annular building drum upon which a polymeric form comprising a shear band is assembled or manufactured. By further example, in other embodiments, the base member is a structural member to be employed in a finished product, such as comprising a hub upon which a shear band is positioned. Subsequently, the base member is arranged in conjunction with the thermal expansion member and any other components of the curing device to cure the uncured polymeric form. In certain embodiments, the base member arranges with other components of the curing device to form a curing chamber within which the uncured polymeric form is placed for curing.

It is appreciated that the base member may comprise any shaped object, such as a plate, cylinder, sphere, tube, or ring, for example. Also, in being arranged along a base member, the uncured polymeric form may be directly arranged along the base member or an intermediate may be arranged between the base member and the uncured polymeric form. For example, an intermediate may comprise one or more spacers, a non-stick coating or composition, a lubricant composition, a liner or protective sheet, a non-stick sheet, a spacer, or a die having molding features, or any other desired object. In particular embodiments, the intermediate facilitates release of the cured polymeric form from the base member to deter or resist any bonding or adherence of the polymeric form to the base member. It is appreciated that the base member may include projections or voids for molding reciprocal or complimentary features into the uncured polymeric form. The molding features may be transverse to further facilitate demolding.

It is appreciated that the uncured polymeric form may comprise any form that includes uncured polymeric material, such as any natural or synthetic rubber, plastic, polymer, or elastomer composition for example. The uncured polymeric form may also include non-polymeric material. For example, the uncured polymeric form may be reinforced with wire, cord, or other textile. The polymeric form may also comprise any desired shape, such as a rectangle, cylinder, sphere, tube, or ring, for example, suitable for placement within the curing chamber, or, stated differently, the curing chamber is shaped to accommodate a polymeric form of any desired shape. In particular embodiments, the polymeric form comprises an annular cylinder having reinforcements arranged there in, the annular cylinder forming a shear band (shear layer) as described in the US patent application publications noted above, with or without an associated tread. It is appreciated that one or a plurality of uncured polymeric forms may be arranged within the curing chamber for concurrent curing.

The thermal expansion member may comprise any form that is at least partially formed of thermally-expanding material. Thermally-expanding material is any material that, for particular curing conditions, expands with an increase in temperature to achieve a desired percent expansion in volume (volumetric expansion) and contracts with a reduction in temperature to achieve a desired percent contraction in volume (volumetric contraction). It is appreciated that the thermally-expanding material is characterized as having a coefficient of thermal expansion, which may be a linear thermal expansion coefficient, an area thermal expansion coefficient, or a volumetric of thermal expansion coefficient. When using a linear thermal expansion coefficient, a change in length ($\Delta L$) due to a temperature change can be determined by multiplying the linear coefficient of thermal expansion ($\alpha_L$) by both the temperature change ($\Delta T$) and the original length (L), which can be expressed as: $\Delta L = \alpha_L \Delta T\, L$. When using an area thermal expansion coefficient, a change in length ($\Delta L$) due to a temperature change can be determined by multiplying the area coefficient of thermal expansion ($\alpha_A$) by both the temperature change ($\Delta T$) and the original area (A), which can be expressed as: $\Delta A = \alpha_A \Delta T\, A$. When using a volumetric thermal expansion coefficient, a change in length ($\Delta L$) due to a temperature change can be determined by multiplying the volumetric coefficient of thermal expansion ($\alpha_V$) by both the temperature change ($\Delta T$) and the original volume (V), which can be expressed as: $\Delta V = \alpha_V \Delta T\, V$.

It is appreciated that the thermally-expanding material may comprise any material known to one of ordinary skill suitable to achieve the intended purpose. In particular exemplary embodiments, a thermally-expanding material has a linear coefficient of thermal expansion within a practical range for polymeric material of 40 E^-6 to 200 E^-6 1/degree Kelvin (K), with a preferred range that is greater than or equal to 80 E^-6 1/degree K. By further example, in other particular embodiments, a thermally-expanding material has a volumetric coefficient of thermal expansion that is equal to the linear coefficient of thermal expansion multiplied by 3, which, when using the linear coefficient expressed in the example above, is equal to 120 E^-6 to 600 E^-6 1/degree K), with a preferred range that is greater than or equal to 240 E^-6 1/degree K. Simply multiplying the linear coefficient of thermal expansion by 3 is commonly employed to determine the volumetric coefficient of thermal expansion for isotropic materials, so it is appreciated that the thermally-expanding material comprises an isotropic material in particular embodiments. In more particular exemplary embodiments, the thermal expansion member is partially or substantially formed of nylon (the thermally-expanding material).

In operation, the thermal expansion member generates and imposes pressures upon the polymeric form. In particular embodiments, the pressure exerted onto the uncured polymeric form is substantially 10 bars. In other embodiments, the thermal expansion member exerts substantially 30 to 50 bars, such as when curing a polymeric form comprising a shear band for use with a non-pneumatic tire, for example. The amount of pressure can be controlled by the selection of material for use in forming the thermal expansion member, the physical design of the thermal expansion member, and the particular arrangement of one or more thermal expansion members relative to the polymeric form, for example.

It is appreciated that the thermal expansion member may comprise any desired shape, such as a rectangle, cylinder, sphere, tube, ring, or combination thereof. It is also appreciated that one or a plurality of thermal expansion members may be arranged within the curing chamber to perform curing operations. It is also appreciated that the thermal expansion member may be configured to apply a substantially constant or variable pressure along the uncured polymeric form. For example, variable pressure may be generated by forming the thermal expansion member from multiple thermally-expanding materials having different coefficients of thermal expansion. Additionally or alternatively, the thermal expansion member may be shaped or sized to generate variable pressures. Finally, a combination of different thermal expansion members may be employed in a single curing chamber to achieve variable pressure generation. Moreover, the thermal expansion material may be configured to form fit about an irregularly shaped uncured polymeric form to control the pressure applied to the uncured polymeric form.

As noted above, in arranging each of the polymeric form and the thermal expansion member within the curing cavity, the thermal expansion member is placed in operable or forceful communication with the uncured polymeric form such that expansion of the thermal expansion member applies pressure or a compressive force to the polymeric form. For example, in particular embodiments, the thermal expansion member is arranged adjacent to the uncured polymeric form, where upon expansion, the thermal expansion member is in direct contact with the uncured polymeric form. It is also appreciated that the thermal expansion member may be arranged to directly engage the uncured polymeric form or an intermediate may be arranged between the thermal expansion member and the uncured polymeric form. For example, an intermediate may comprise one or more spacers, a non-stick coating or composition, a lubricant composition, a liner or protective sheet, a non-stick sheet, a spacer, or a die having molding features, for example, or any other desired object. In particular embodiments, the intermediate facilitates separation of the cured polymeric form from the thermal expansion member to deter or resist any bonding or adherence of the polymeric form to the thermal expansion member. It is also appreciated that the thermal expansion member may include projections or voids for molding reciprocal or complimentary features into the uncured polymeric form.

As noted above, in particular embodiments the curing device includes a curing chamber defining a volume configured to contain an uncured polymeric form. In certain embodiments, the volume of the curing chamber is configured to contain both the uncured polymeric form and a thermal expansion member. It is appreciated that in any event, the curing chamber may be of any shape to define a like-shaped volume. For example, in particular embodiments, the curing chamber is ring-shaped to define a ring-shaped volume. In other exemplary embodiments, the curing chamber is spherical, cylindrical, or rectangular.

Particular embodiments of such methods include arranging a constraining member on a side of the thermal expansion member opposite the uncured polymeric form, the constraining member maintaining a position of the thermal expansion member during the step of maintaining the thermal expansion member in the expanded state. It is appreciated that in certain instances, expansion of the thermal expansion member may alone direct sufficient pressure to the polymeric form, such as when the thermal expansion member is a ring or any other hollow shape, such as a cylindrical or rectangular shape, for example. In other instances, the curing device includes a constraining member configured to maintain the thermal expansion member in a desired location during thermal expansion to ensure sufficient pressure is applied to the uncured polymeric form. This constraining member is arranged such that the thermal expansion member and the polymeric form are arranged between the constraining member and the base member, where together the base and the constraining member maintain and constrain the relative positions of the thermal expansion member and the polymeric form. The constraining member is also semi-rigid or rigid at least for curing, as described herein in association with the base member. And just as the base may form any desired shape, so may the constraining member. In doing so, it is appreciated that each of the base member and the constraining member may comprise similar or like shapes of different size or may comprise different shapes. Accordingly, in particular embodiments, the constraining member includes a hollow cylinder that is unitary or monolithic. It is appreciated that one or a plurality of constraining members may be employed concurrently by a single curing device to constrain the one or a plurality of thermal expansion members. It is also appreciated that any intermediate contemplated herein may be arranged between the constraining member and the thermal expansion member. Optionally, the curing device may include one or more side members each or collectively extending between the base and the constraining member, which may substantially enclose the curing chamber. Any side member may also be rigid or semi-rigid, at least for curing, and may be configured to engage the polymeric form and/or the thermal expansion member. Finally, any base member, constraining member, intermediate, and/or side member may include molding features, such as one or more projections and/or voids, for forming corresponding features along an outer side or surface of the polymeric form.

In particular embodiments, the method for curing a polymeric form includes heating the thermal expansion member to expand the thermal expansion member in size to an expanded state, where in the expanded state the thermal expansion member applies pressure to the uncured polymeric form with the base member being in a rigid or semi-rigid curing configuration. By doing so, the uncured polymeric form is in a compressive state. Upon heating the thermal expansion member above an ambient temperature of the local environment or a pre-cure temperature, the thermal expansion member expands such that the expansion material applies a desired amount of pressure to the uncured polymeric form. Once expanded, particular embodiments of such methods include maintaining expansion of the thermal expansion member in the expanded state, for a duration, to maintain the application of pressure to the uncured polymeric form, and any compressive state, while the uncured polymeric form is being cured to form a cured polymeric form. It is appreciated that the heat applied and/or the temperature of thermal expansion member may remain constant for a desired duration of the curing operation, or may be varied during the curing operation to timely control and alter the pressure being applied to the polymeric form.

Heating may be achieved by any known manner using any known heating mechanism. For example, a heating element or heating fluid may be arranged within or in contact with any component of the curing device or may beat the curing device using radiant and/or conventional heating techniques. By further example, the curing device may be partially or fully placed within an oven. It is appreciated that the curing chamber may have a volume that remains partially unfilled after the thermal expansion member is fully expanded, or may have a volume that is filled after the thermal expansion member is fully expanded. In instances where the curing chamber volume is substantially filled, it is appreciated that the curing chamber may be undersized, such that the thermal expansion member and/or the polymeric form (which may also increase in size due to heat expansion) applies a pressure to the structure forming the curing chamber. It is also appreciated that the curing chamber may have a constant volume or a variable volume that may change during the curing operation to maintain a desired amount of pressure upon the polymeric form. The pressure exerted on the uncured polymeric form, in combination with any elevated temperatures, cures the uncured polymeric form into a cured polymeric form.

It is appreciated that the coefficient of thermal expansion of the thermal expansion member may be greater, equal to, or less than the coefficient of thermal expansion of the uncured polymeric form and/or of any other component forming the curing device, including the base member and any constraining member and any side member. It is appreciated that, in particular embodiments, the uncured polymeric form may be cured within the curing device without the presence of any thermal expansion member. When no thermal expansion member is present, the uncured polymeric form expands within the curing chamber and engages any constraining member or any side member to facilitate the application of pressure between itself and any structure forming the curing chamber.

Particular embodiments of such methods includes curing the uncured polymeric form to form a cured polymeric form. As noted herein, the application of pressure by the thermal expansion member facilitates curing. Optionally, such methods may include heating the uncured polymeric form to a desired temperature to also facilitate curing of the uncured polymeric form. In certain instances, heating of the uncured polymeric form occurs during the step of maintaining the expansion of the thermal expansion member, where heating of the uncured polymeric form expands the uncured polymeric form to maintain and/or increase the pressure being applied to the uncured polymeric form. Optionally, such methods may include the addition of any chemicals to generate any chemical reaction necessary for curing.

Particular embodiments of such methods include separating the cured polymeric form and the thermal expansion member. It is appreciated that separating the cured polymeric material from the curing device may occur without reducing the size of the thermal expansion member from an expanded state. In certain embodiments, however, separation is facilitated by cooling the thermal expansion member from the expanded state to reduce the size of the thermal expansion member. By example, reducing the thickness. Additionally, or alternatively, in other embodiments, separation is facilitated by cooling the cured polymeric form to reduce the size of the cured polymeric form. In any event, cooling comprises cooling the thermal expansion member and/or cured polymeric form below a curing temperature, whether or not the cooled temperature reaches any ambient or pre-cure temperature, such that the corresponding thermal expansion member and/or cured polymeric form contracts and shrinks in size to permit separation and/or demolding of the cured polymeric form from the curing device. Additionally or alternatively, the base member may be cooled to contract and shrink in size, permitting separation and/or demolding of the cured polymeric form from the curing device. Cooling may be achieved by any known manner using any known cooling mechanism. For example, a cooling element or coolant fluid may be arranged within or in contact with any component of the curing device or may cool the curing device using radiant or convection cooling techniques. By further example, the curing device may be partially or fully placed within a refrigeration unit.

In particular embodiments, the step of demolding may include demolding the polymeric form by removing the polymeric form from the curing device. This may be achieved by separating, removing, or expanding one or more components of the curing device to permit removal of the cured polymeric form with or without a base member. In instances when the curing device is an annular curing device, certain components of the curing device may be translate axially and/or radially to permit removal of the cured polymeric form.

Particular embodiments of the methods and apparatus for curing an uncured polymeric form discussed above will now be described in further detail below in association with the figures filed herewith providing exemplary embodiments of the curing device for performing particular embodiments of the methods discussed above.

Figure 1:
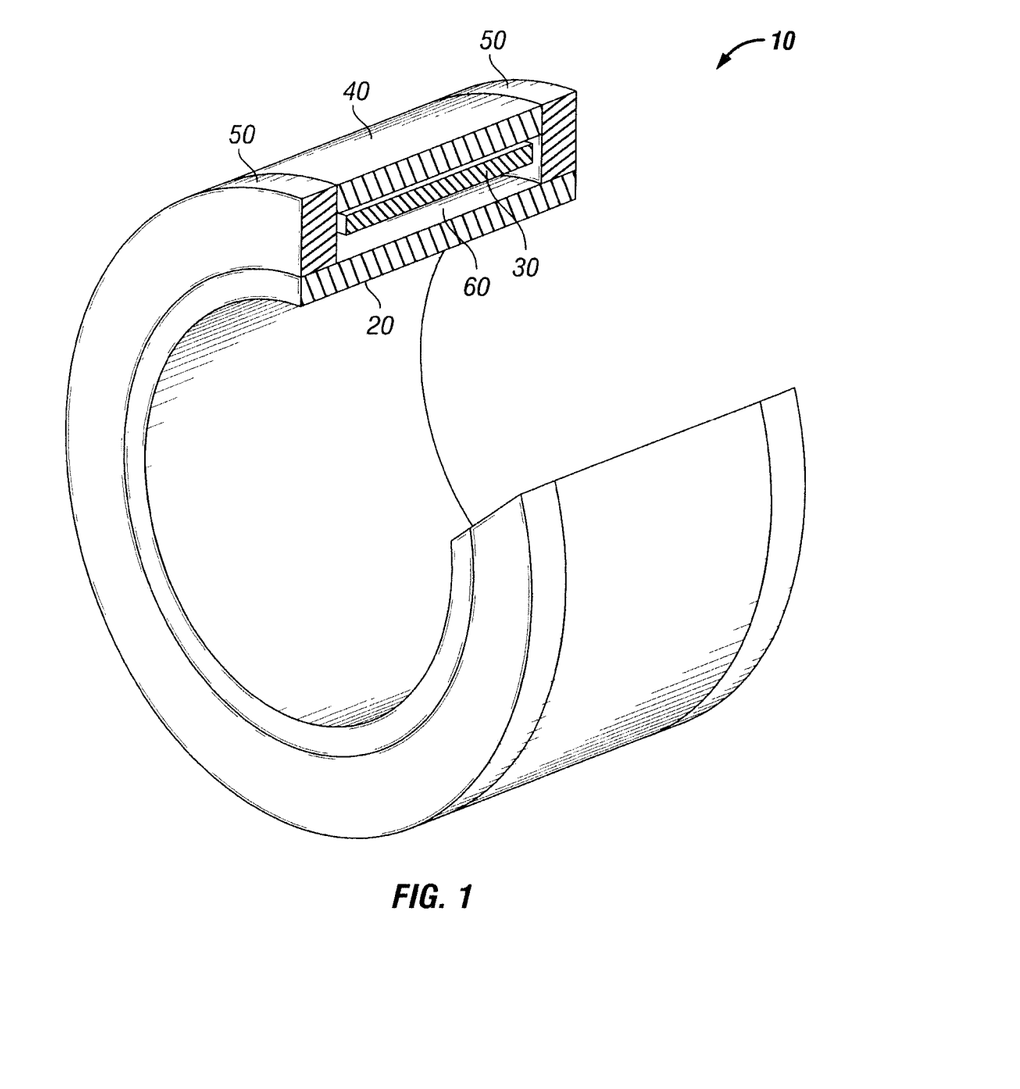
FIG. 1 is a front perspective view including a sectioned portion of a curing device for curing an annular uncured polymeric form, in accordance with an embodiment of the invention.

In an exemplary embodiment shown in FIG. 1, a curing device 10 includes a base member 20 configured to receive an uncured polymeric form, the base member being substantially rigid at least in a curing configuration and a thermal expansion member 30 configured to be arranged in close relation to an uncured polymeric form arranged along the base member 20 on a side of the uncured polymeric form opposite the base member. A constraining member 40 is also shown arranged on a side of the thermal expansion member 30 opposite base member, the constraining member configured to maintain a position of the thermal expansion member when in the expanded state. The constraining member is at least semi-rigid at least in a curing configuration. The base member 20 is spaced apart, in a radial direction, from the constraining member 40 to partially define a curing chamber 60. Contained within the curing chamber 60 is the thermal expansion member 30. As noted above, it is anticipated, in other embodiments, a constraining member is not present, such as when the thermal expansion member is formed of a hollow annular shape, such a hollow cylinder of rectangle, for example. The embodiment shown also includes opposing side members 50, which also assist in defining curing chamber 60, which may be optionally present in other embodiments. It is appreciated that one or both of the side members 50 may be attached to, or unitary with or monolithic with, the constraining member 40 and/or the base member 20.

The curing device is configured to facilitate arrangement of an uncured polymeric form within the curing device 10 and removal of a cured polymeric form from the curing device. This can be achieved in many different manners. For example, in the embodiment shown, one or both side members 50 are configured to separate or displace between an open configuration and a curing arrangement. In the open arrangement, with reference to the exemplary embodiment of FIG. 2, at least one of the side members is spaced apart from one or both of the base member 20 and the constraining member 40 for arranging an uncured polymeric form within the curing device and removing a cured polymeric form from the curing device. In the curing arrangement, with reference to the exemplary embodiment shown in FIGS. 3-5, each of the side members 50 are operably engaged with the base member 20 and the constraining member 40 to define the curing chamber 60. In these embodiments, one of the side members are configured to move since each of the base member and the constraining member are unitary or monolithic. In moving between the open and curing arrangements, at least one of the side members translates in a sideways direction or axial direction of the curing device. In other variations, any separable side member may be formed of two or more portions that are separable and movable relative each other so that the side member and any such portion may be separated from the base member and/or the constraining member in any direction, including a radial direction. It is noted that in the embodiments shown, one of the side members 50 is attached to, or forms a portion of, the constraining member 40. It is appreciated, however, that the side member may instead be attached to, or form a portion of, the base member.

In the embodiments shown in FIGS. 1-5, the base member and constraining member remain unitary as the curing device articulates between open and curing arrangements, even though each may or may not be capable of disassembly into subcomponents. In remaining unitary, it is appreciated that each of the base member and the constraining member may be fixedly unitary (that is, incapable of separation into subcomponents without damaging structure or function), unitary yet separable into subcomponents, or monolithic. In other variations, as discussed previously, to facilitate receipt and removal of a polymeric form, any base member and/or constraining member may be formed of separable subcomponents and any of such subcomponent may articulate in any desired direction, including a radial direction, to place the curing device in any open arrangement and any curing arrangement.

In the embodiments shown in FIGS. 1-5, the exemplary curing device 10 is configured to receive and cure an annular polymeric form comprising a ring or hollow cylinder. Likewise, the thermal expansion member 30 is an annular structure comprising a ring or hollow cylinder, which is unitary or monolithic in the present embodiment.

Figure 2:
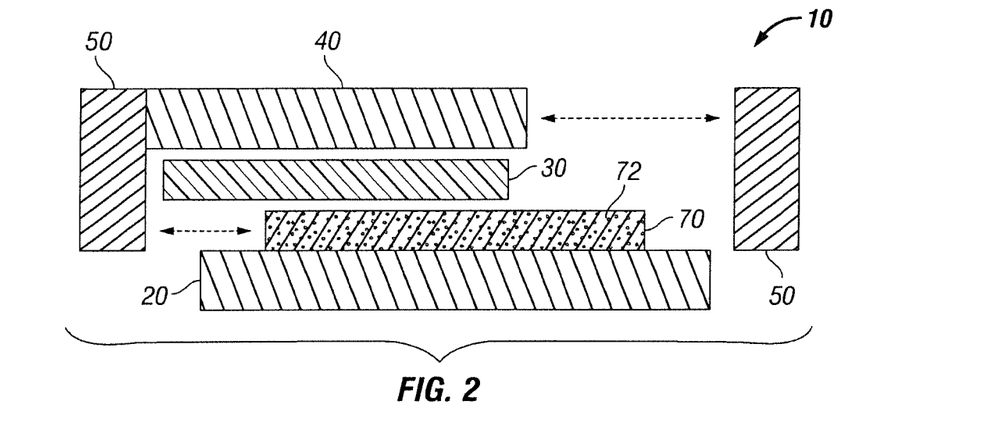
FIG. 2 is a front sectional view of sectioned portion of the curing device in FIG. 1, shown in an open, loading configuration.

With reference to FIG. 2, the curing device 10 is shown in an open arrangement, where an uncured polymeric form 70 is being arranged within the curing device. In the embodiment shown, the uncured polymeric form is arranged on the base member 20, which together are received into the curing device 10. It is anticipated that the uncured polymeric form may be arranged on the base member at any time before the curing device articulates from an open arrangement and to a cured arrangement. In particular instances, the uncured polymeric form is formed or manufactured on the base member, which together are transferred to the curing device for curing. In the embodiment shown, it is noted that the uncured polymeric form 70 includes various reinforcements 72, which may or may not be polymeric.

Figure 3:
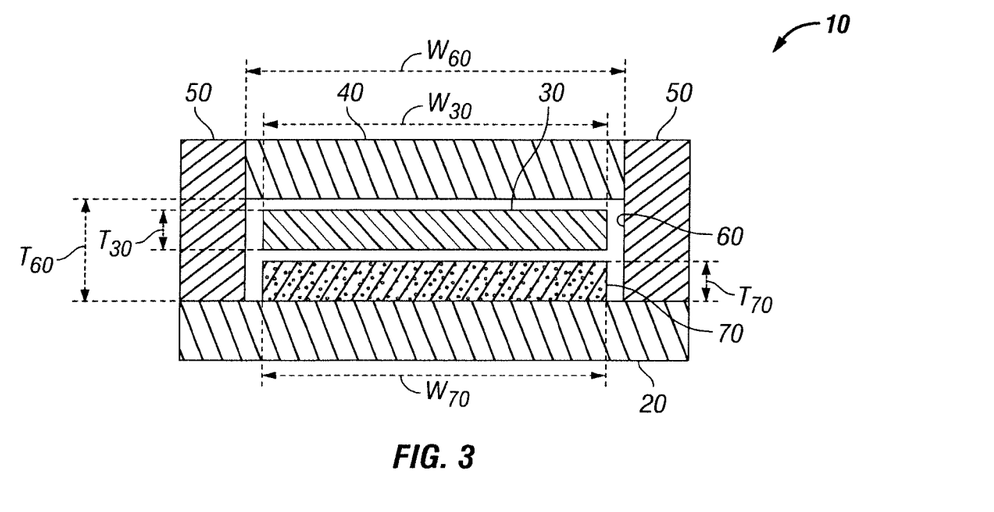
FIG. 3 is a front sectional view of the curing device of FIG. 2, shown in a loaded configuration showing an annular uncured polymeric form arranged within the curing chamber of the curing device, where a thermal expansion ring is in an unexpanded or contracted state, in accordance with an embodiment of the invention.

With reference now to FIG. 3, the curing device 10 is shown in a curing arrangement prior to curing the uncured polymeric form and fully expanding the thermal expansion member (which is referred to a pre-cure state of the curing arrangement). Specifically, the curing device is shown after having articulated from the open arrangement in FIG. 2 to the curing arrangement, but prior to fully expanding the thermal expansion member for curing. It is appreciated that in a pre-cure state, the thermal expansion member may be at an ambient temperature or at an elevated temperature above ambient but below a desired curing temperature, such as when the thermal expansion member is preheated prior to initiating curing of the polymeric form. It is appreciated that the curing device may articulate between open and curing arrangements manually or using any mechanism(s) for translating and/or rotating any curing device component(s), which may or may not be automated. To facilitate automation, any programmable logic controller may employed in operable communication with any desired memory storage device, which includes instructions for performing any one or more steps in accordance with any embodiment of the methods discussed herein.

In the initial curing arrangement shown in FIG. 3, prior to curing, the volume of the curing chamber 60 is initially partially filled with the uncured polymeric form 70 and the thermal expansion member 30. Particularly, in a pre-cure state of the curing device in the curing arrangement shown, the width of the curing chamber $W_{60}$ is greater than a pre-cure width of the thermal expansion member $W_{30}$ and a pre-cure width of the polymeric form $W_{70}$. Additionally, the sum of a pre-cure thickness $T_{30}$ of the thermal expansion member 30 and of a pre-cure thickness $T_{70}$ of the polymeric form 70 is shown to be less than the curing chamber thickness $T_{60}$, which also describes the pre-cure distance separating the base member 20 and the constraining member 40 (contemplating the absence of a curing chamber in other embodiments). In lieu of the curing chamber being partially filled upon initially placing the curing device in a curing arrangement, it is appreciated that in other embodiments, the volume of the curing chamber may be fully consumed initially upon arranging the curing device in a curing arrangement prior to fully expanding the thermal expansion member for curing the uncured polymeric form.

Figure 4:
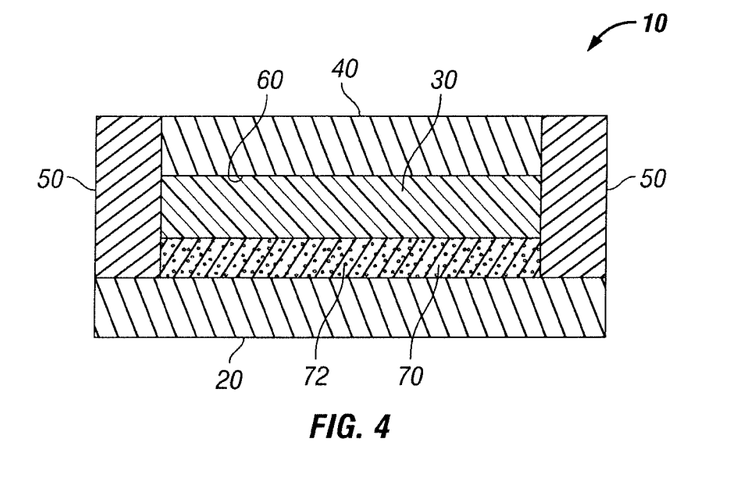
FIG. 4 is a sectional view of the curing device of FIG. 3, shown in a curing configuration where the thermal expansion ring is heated to an expanded state, whereby the thermal expansion ring is applying pressure to an uncured polymeric form arranged within the curing chamber, in accordance with an embodiment of the invention.

Now referring to FIG. 4, after initially placing the curing device 10 in a curing arrangement, such as shown in FIG. 3, heat is applied to expand the thermal expansion member 30 to a curing size in an expanded state, where the width and thickness of the thermal expansion member increases. As a result, curing pressure is generated and applied to the uncured polymeric material 70. The application of heat may also expand the uncured polymeric form, the base member, and any other component of the curing device, which may facilitate further consumption of the curing chamber or even contraction of the curing chamber, all of which may be used to control the generation and application of pressure upon the polymeric form. While the volume of the curing chamber 60 is shown to be fully consumed by the thermal expansion member 30 and the polymeric form 70 during curing, it is appreciated that the curing chamber may remain partially consumed during curing. As noted above, the application of pressure upon the polymeric form is maintained and controlled until the curing process is completed and the uncured polymeric form is transformed into a cured polymeric form. It is appreciated that constant or variable pressures may be maintained during the curing process.

Figure 5:
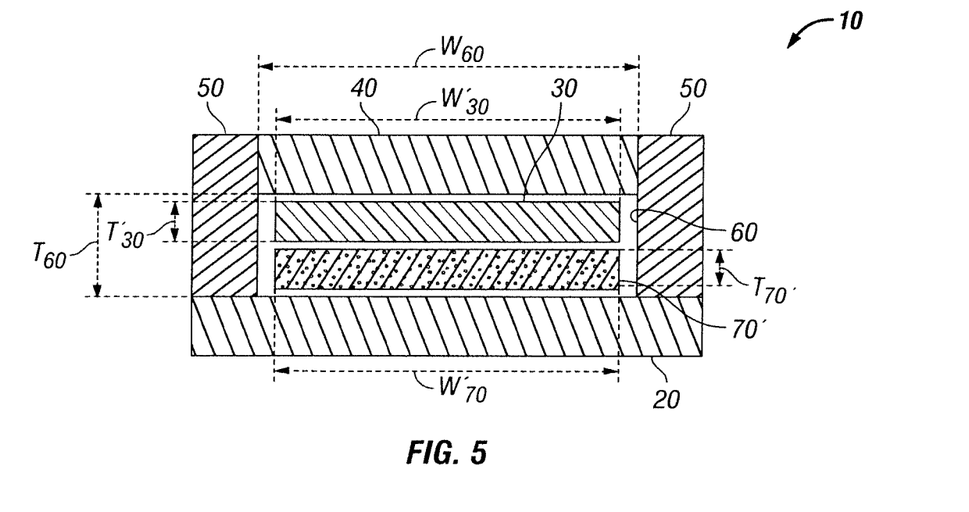
FIG. 5 is a sectional view of the curing device of FIG. 4, shown in a post-cure configuration where after the polymeric form has been cured, the thermal expansion ring is in an unexpanded or contracted state to facilitate separation and removal of the a cured polymeric form from the curing device, in accordance with an embodiment of the invention.

With reference now to FIG. 5, a cured polymeric form 70' is shown separated from the thermal expansion member 30 in a post-cure state. After curing, the cured polymeric form is to be separated from engagement with the curing device and removed. While separation and removal may be achieved while the curing device and/or the thermal expansion member is in a heated state, such as by mechanically separating any one or more components of the curing device to place the curing device in an open arrangement, in the embodiment shown, the thermal expansion member is cooled to relieve the pressure being applied to the polymeric form. Of course, cooling may or may not include also cooling the cured polymeric form and/or any other components of the curing device. Cooling achieves a reduction in pressure by reducing the size of the thermal expansion member and, if also cooling the cured polymeric form and/or other components of the curing device, by reducing the size of the cured polymeric form and/or the other curing device components. In FIG. 5, thermal expansion member 30 is shown to have a reduced width $W'_{30}$ and thickness $T'_{30}$, and cured polymeric form 70' is shown to have a reduced width $W'_{70}$ and thickness $T'_{70}$. It is understood that the amount of cooling employed may or may not reduce any cooled structure to its pre-cure or pre-expansion size. Upon achieving any such reduction in size, separation may automatically occur without having to mechanically articulate or separate any component of the curing device to form an open arrangement. Accordingly, in particular embodiments, such as the embodiment shown, substantial separation occurs between the cured polymeric form and the curing device automatically prior to articulating the curing device from a curing arrangement to an open arrangement. That being said, it is appreciated pre-configuring the curing chamber to have excess volume in a post-cure state could further assist in facilitating separation upon cooling.

After curing, the curing device is articulated to an open arrangement, and the cured polymeric form 70' is removed from the curing device. It is appreciated that the open arrangement may comprise the same open arrangement employed to arrange the uncured polymeric material originally within the curing device, such as is shown in FIG. 2 in the present example, or any other open arrangement as may be desired. For example, in lieu of the curing device of FIG. 5 returning to the arrangement shown in FIG. 2, the base member and polymeric form may instead exit the curing device in the same direction or an opposing direction from which each entered the curing device.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A method of curing a polymeric form, the method comprising the steps of:
   arranging an uncured polymeric form along a base member, the base member being at least semi-rigid at least when in a curing configuration;
   arranging a thermal expansion member in close relation to the uncured polymeric form and either on a side of the uncured polymeric form opposite the base member or between the uncured polymeric form and the base member;
   arranging a constraining member relative to the base member such that the thermal expansion member and the uncured polymeric form are both positioned between the constraining member and the base member, the thermal expansion member and the uncured polymeric form being enclosed within a curing chamber formed by the base member, the constraining member, and one or more side members when in a curing arrangement, the side members being separable from each of the base member and the constraining member, the constraining member maintaining a constant position in relation to the base member with the constraining member being at least semi-rigid at least when in a curing configuration;

heating the thermal expansion member to expand the thermal expansion member in size into an expanded state, where in the expanded state the thermal expansion member applies pressure to the uncured polymeric form with both the base member and the constraining member being in an at least semi-rigid curing configuration;

maintaining expansion of the thermal expansion member in the expanded state to maintain the application of pressure to the uncured polymeric form while the uncured polymeric form is being cured to form a cured polymeric form;

curing the uncured polymeric form to form the cured polymeric form; and separating the cured polymeric form and the thermal expansion member.

2. The method of claim 1, where in the step of arranging the uncured polymeric form along the base member, an intermediate is arranged between the uncured polymeric form or the thermal expansion member and the base member to facilitate release of the cured polymeric form or the thermal expansion member from the base member.

3. The method of claim 1, where in the step of arranging the thermal expansion member in close relation to the uncured polymeric form, an intermediate is arranged between the uncured polymeric form and the thermal expansion member to facilitate separation of the cured polymeric form from the thermal expansion member.

4. The method of claim 1, where the step of separating includes cooling the thermal expansion member from the expanded state to reduce the size of the thermal expansion member.

5. The method of claim 1, where the step of separating includes cooling the cured polymeric form to reduce the cured polymeric form in size.

6. The method of claim 1 further including the step of:
heating the uncured polymeric form to a desired temperature to facilitate curing of the uncured polymeric form.

7. The method of claim 6, where the step of heating the uncured polymeric form occurs during the step of maintaining expansion, where heating of the uncured polymeric form expands the uncured polymeric form to maintain and/or increase the pressure being applied to the uncured polymeric form.

8. The method of claim 1, where the base member forms an annular shape and the constraining member forms an annular hollow shape.

9. The method of claim 8, where the constraining member and the base member are each unitary.

10. The method of claim 1, where the step of maintaining expansion of the thermal expansion member provides variable expansion of the thermal expansion member during the step of maintaining.

11. The method of claim 10, where the thermal expansion member is formed of multiple materials each having a different coefficient of thermal expansion to provide the variable expansion.

12. The method of claim 1, where the pressure applied to the uncured polymeric form is substantially uniform across a cross-section of the uncured polymeric form.

13. The method of claim 1, where the uncured polymeric form is arranged along the base member prior to arrangement with the thermal expansion member, the uncured polymeric form being formed along the base member and subsequently transferred together for use in this method.

14. The method of claim 13, where the uncured polymeric form is an annular shape comprising a shear band for use as a component of a non-pneumatic tire, the uncured polymeric form including one or more non-polymeric reinforcements, where the base member forms a hub for use as a component of a non-pneumatic tire.

15. The method of claim 1, where the thermal expansion member is nylon or has a linear coefficient of thermal expansion of 40 $E^{-6}$ to 200 $E^{-6}$.

16. A curing device for curing a polymeric form, the curing device comprising:
a base member configured to receive an uncured polymeric form, the base member being at least semi-rigid at least in a curing configuration;
a thermal expansion member configured to be arranged in close relation to the uncured polymeric form arranged along the base member on a side of the uncured polymeric form opposite the base member;
a constraining member arranged on a side of the thermal expansion member opposite the base member, the constraining member configured to maintain a position of the thermal expansion member when in an expanded state with the constraining member being at least semi-rigid at least in a curing configuration;
a curing chamber configured to receive the uncured polymeric form and contain the thermal expansion member, where the thermal expansion member and the uncured polymeric form are enclosed within the curing chamber formed by the base member, the constraining member, and one or more side members when in a curing arrangement, the side members being separable from each of the base member and the constraining member; and
where the thermal expansion member is configured to expand in size into an expanded state with application of heat, where in the expanded state the thermal expansion member applies pressure to the uncured polymeric form with the base member and the constraining member being in a substantially rigid curing configuration.

17. The curing device of claim 16, where the constraining member and the base member each form an annular shape.

18. The curing device of claim 16, where the constraining member and the base member are each unitary.

19. A method of curing a polymeric form, the method comprising the steps of:
arranging an uncured polymeric form along a base member, the base member being at least semi-rigid at least when in a curing configuration;
arranging a thermal expansion member in close relation to the uncured polymeric form and between the uncured polymeric form and the base member;
arranging a constraining member relative to the base member such that the thermal expansion member and the uncured polymeric form are both positioned between the constraining member and the base member, the constraining member maintaining a constant position in relation to the base member with the constraining member being at least semi-rigid at least when in a curing configuration;

heating the thermal expansion member to expand the thermal expansion member in size into an expanded state, where in the expanded state the thermal expansion member applies pressure to the uncured polymeric form with both the base member and the constraining member being in an at least semi-rigid curing configuration;

maintaining expansion of the thermal expansion member in the expanded state to maintain the application of pressure to the uncured polymeric form while the uncured polymeric form is being cured to form a cured polymeric form;

curing the uncured polymeric form to form the cured polymeric form; and separating the cured polymeric form and the thermal expansion member.

* * * * *